May 2, 1933.  E. G. BODEN  1,906,521
BEARING LOCKING MEANS
Filed May 25, 1932
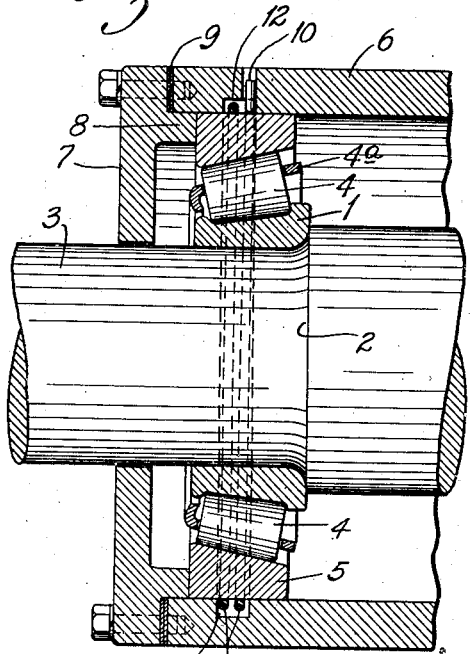
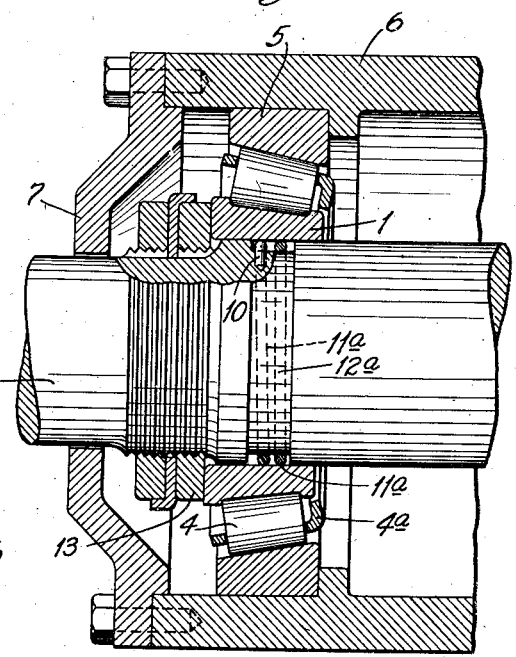
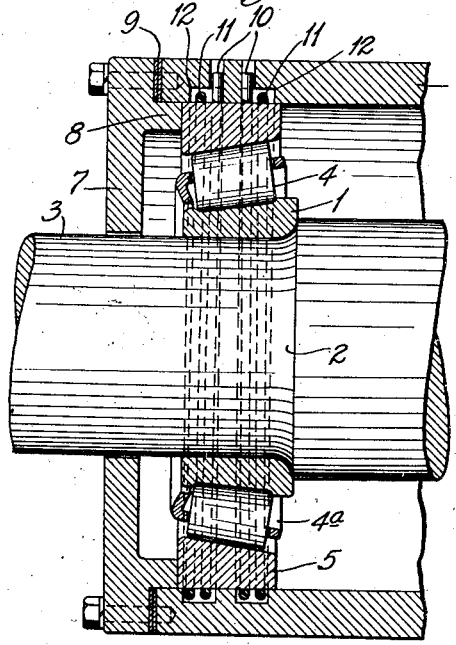
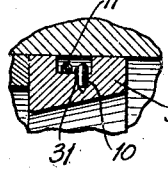 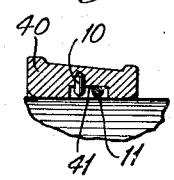
INVENTOR:
Ernest G. Boden,
by Carr Han Gravely
HIS ATTORNEYS Patented May 2, 1933

1,906,521

UNITED STATES PATENT OFFICE

ERNEST G. BODEN, OF CANTON, OHIO, ASSIGNOR TO THE TIMKEN ROLLER BEARING COMPANY, OF CANTON, OHIO, A CORPORATION OF OHIO

BEARING LOCKING MEANS

Application filed May 25, 1932. Serial No. 613,418.

My invention relates to the positioning of raceway members of roller bearings and it has for its principal object a locking means that will prevent rotation of said member with respect to its mounting while permitting longitudinal movement thereof.

The invention consists principally in a helical spring extending around the inner or outer periphery of a raceway or bearing member and having one end anchored to the mounting member for said bearing member so that longitudinal movement of the bearing member is permitted, but any tendency of the bearing member to rotate relative to its mounting member causes the spring to engage the bearing member so tightly as to prevent such rotation. The invention also consists in the bearing locking means and in the parts and combinations and arrangements of parts hereinafter described and claimed.

In the accompanying drawing, which forms part of this specification, and wherein like numerals refer to like parts wherever they occur, Fig. 1 is a diagrammatic sectional view of a taper roller bearing whose cup or outer bearing member is the adjusting member of the bearing and is provided with locking means embodying my invention, Fig. 2 is a similar view of a bearing in which the cone or inner bearing member is the adjusting member and is provided with such locking means, Fig. 3 is a view similar to Fig. 1 showing two locking springs of opposite hand, such arrangement being desirable where the shaft or spindle rotates in either direction, and Figs. 4 and 5 are detail sectional views of an outer bearing member and inner bearing member, respectively, having the locking device mounted therein.

In Fig. 1 is illustrated a cone 1 or inner bearing member seated against a shoulder 2 on a rotary spindle or shaft 3, conical rollers 4 mounted on said inner bearing member and a cup 5 or outer bearing member for said rollers. A cage 4a may be provided for said rollers 4. Said cup 5 is mounted in a housing member 6 and is positioned by means of a ring 7 at the end of said housing provided with an annular flange 8 abutting against the cup 5. Shims 9 positioned between said ring 7 and the end of the housing 6 constitute the adjusting means for the cup.

Anchored in the housing is one end 10 of a helical spring 11 that is disposed in an annular groove 12 in said housing 6 and that surrounds the outer periphery of said cup 5. Rotation of the shaft 3 will cause rotation of the rollers 4 and cage 4a and as said cup 5 is loose in the housing 6, said cup 5 will tend to rotate or creep therein, thus causing said spring 11 to tighten on the cup 5 and prevent rotation or creeping of the cup 5 in the housing 6. Longitudinal movement of said cup 5, which is required when the bearing is to be adjusted is permitted by said spring 11. Rotation of the shaft in the opposite direction would, of course, result in the spring 11 becoming loose on the bearing cup 5 so that rotation thereof in the housing 6 would be permitted; and the construction illustrated in Fig. 1 is used where the spindle or shaft 3 rotates most of the time, or entirely, in one direction.

In Fig. 2, the end 10 of the spring 11a is anchored to a rotary spindle 3a on which the cone 1 is mounted and the spring 11a rests in a peripheral groove 12a in said spindle 3a. The cone 1 is the adjusting member and is held in position by a nut 13. Rotation of the spindle 3a in a direction to unwind the spring 11a causes it to tightly engage the bore of the cone, thereby preventing rotation thereof on the spindle.

Fig. 3 illustrates a modification for devices wherein the bearing rotates in both directions. In this construction, two springs 11 of opposite hand are used; so that rotation in one direction causes one spring 11 to function and rotation in the other direction causes the other spring to function.

Figs. 4 and 5 are modifications in which the spring is anchored to the bearing member instead of to the shaft or housing. In Fig. 4, the cup 30 has a groove 31 around its outer periphery in which is mounted the spring 11 having one end 10 anchored to the cup.

In Fig. 5 the cone 40 has an internal annular groove 41 in which the spring 11 is mounted.

The above described locking means effectively prevents rotation of a bearing member relative to its mounting without destroying its capacity for longitudinal movement to adjust the bearing. The invention is particularly applicable to the mounting of antifriction bearings on high speed spindles and shafts such as those of grinding machines and the like, where looseness of the spindle in the inner bearing member, or of the cup in the housing will result in defective work. The preferred forms have the further advantage of requiring no change in the construction of the bearing members themselves; so that a standard bearing may be mounted with either one of its bearing members provided with the hereinbefore described locking means. Obviously it is equally applicable to ball bearings and other types of antifriction bearings.

What I claim is:

1. A locking means for a bearing member of an antifriction bearing comprising a helical spring anchored at one end and fitting the periphery of said bearing member, whereby rotation of the member to which said spring is anchored causes said spring to engage said bearing member to prevent rotation thereof.

2. In combination, an antifriction bearing comprising an inner bearing member, an outer bearing member and rolling members therebetween, a support for said inner bearing member and a support for said outer bearing member, and a locking means comprising a helical spring anchored at one end to one of said mounting members and engaging the periphery of the corresponding bearing member.

3. In combination, an antifriction bearing comprising an inner bearing member, an outer bearing member and rolling members therebetween, a support for said inner bearing member and a support for said outer bearing member, and a locking means comprising helical springs of opposite hand anchored at one end of said mounting members and engaging the periphery of the corresponding bearing member.

4. In combination, a rotary spindle, a bearing cone thereon, rollers on said cone, a bearing cup for said rollers, a housing in which said cup is mounted, said housing having an annular groove around its inner periphery and a helical spring having one end anchored in said housing and being disposed in said groove to engage the outer periphery of said bearing cup.

5. In combination, a rotary spindle, a bearing cone thereon, bearing rollers on said cone, a bearing cup for said rollers, said spindle having an annular peripheral groove and a helical spring disposed in said groove and having one end anchored to said spindle, said spring fitting in the bore of said bearing cone.

Signed at Canton, Ohio, this 19th day of May, 1932.

ERNEST G. BODEN.